US005966094A

United States Patent [19]
Ward et al.

[11] Patent Number: 5,966,094
[45] Date of Patent: Oct. 12, 1999

[54] BASE STATION ANTENNA ARRANGEMENT

[75] Inventors: Christopher Robert Ward, Hertfordshire; Andrew William Jeffries, Saffron Walden; Keith Stewart Wilson, Hertfordshire, all of United Kingdom

[73] Assignee: Northern Telecom Limited, Montreal, Canada

[21] Appl. No.: 08/960,441

[22] Filed: Oct. 29, 1997

[30]     Foreign Application Priority Data

Dec. 20, 1996 [GB]   United Kingdom .................... 9626548

[51] Int. Cl.⁶ ...................................................... H01Q 3/22
[52] U.S. Cl. .......................................... 342/373; 370/334
[58] Field of Search ............................ 342/373; 455/422; 370/334

[56]              References Cited

U.S. PATENT DOCUMENTS 5,754,139   5/1998   Turcotte et al. ......................... 342/373
5,815,116   9/1998   Donbridge et al. ..................... 342/373

FOREIGN PATENT DOCUMENTS

1171628   10/1966   United Kingdom .
2281011    2/1995   United Kingdom .
WO 96/23328   8/1996   WIPO .

*Primary Examiner*—Mark Hellner
*Attorney, Agent, or Firm*—Lee, Mann, Smith, McWilliams, Sweeney & Ohlson

[57]              ABSTRACT

The present invention relates to a radio communications base station antenna. In a first embodiment, the arrangement comprises a plurality of antennas each capable of forming a separate narrow beam in azimuth, wherein the antennas are positioned such that the beams formed by the antennas overlap and the centre of each beam falls midway between the centre and first null of the adjacent beam to provide a uniform coverage in azimuth. The present invention can be deployed in mobile wireless terminals. The use of downlink beam-forming is proposed for systems such as Digital AMPS (D-AMPS). A downlink beam-former typically consists of a number of narrow beams formed by either multiple narrow beamwidth antennas or an array of elements in conjunction with a fixed beam-former. Signal processing techniques can then be used to select an appropriate beam directed towards the subscriber.

13 Claims, 7 Drawing Sheets

OMNI-DIRECTIONAL CONFIGURATION
(N = 7 RE-USE FACTOR)

1st TIER RE-USE CELLS

Fig. 2 (b)

TYPICAL TRI-SECTORED CONFIGURATION
(N = 7 RE-USE FACTOR)

1st TIER RE-USE CELL NON-INTERFERING

Fig. 2 (c)

TYPICAL HEX-SECTORED CONFIGURATION
(N = 7 RE-USE FACTOR)

NARROW OVERLAPPING BEAMS

FIXED BEAMS

Fig. 4 (b)

SELECTED BEAMS AT TIME t1

Fig. 4 (c)

SELECTED BEAMS AT TIME t1

| MOBILE CHANNEL ALLOCATION | BEAM NUMBER SELECTED ||
|---|---|---|
| | TIME t1 | TIME t2 |
| ms1 ALLOCATED CHANNEL 1 | b2 | b1 |
| ms2 ALLOCATED CHANNEL 2 | b2 | HANDED OFF TO ADJACENT CELL |
| ms3 ALLOCATED CHANNEL 3 | b6 | b4 |
| ms4 ALLOCATED CHANNEL 4 | b7 | b8 |

BASE STATION ANTENNA ARRANGEMENT

FIELD OF THE INVENTION

This invention relates to a base station antenna arrangement for use in a Cellular Radio communication system.

BACKGROUND TO THE INVENTION

Cellular Radio systems are currently in widespread use throughout the world providing telecommunications to mobile users. In order to meet capacity demand, within the available frequency band allocation, cellular radio systems divide a geographic area to be covered into cells. A base station having one or more antennas communicates with the mobile stations enabling them to communicate with other mobile stations or to subscribers of other communications networks. The available communication channels are divided between the cells such that the same group of channels are reused by certain cells. The distance between the reused cells is planned such that co-channel interference is maintained at a tolerable level.

When a new cellular radio system is initially deployed, operators are often interested in maximising the uplink (mobile station to base station) and downlink (base station to mobile station) range. The range in many systems are uplink limited due to the relatively low transmitted power levels of hand portable mobile stations. Any increase in range means that less cells are required to cover a given geographical area, hence reducing the number of base stations and associated infrastructure costs. Although, concomitant with the reduction in the number of base stations, is a requirement for an increase in the call handling capacity of each base station.

When a cellular radio system is mature the capacity demand can often increase, especially in cities, to a point where more smaller size cells are needed in order to meet the required capacity per unit area. The process used to create these smaller cells is known as cell splitting. Any technique which can provide additional capacity without the need for cell-splitting will again reduce the number of base station sites and associated infrastructure costs.

Figure 1A:
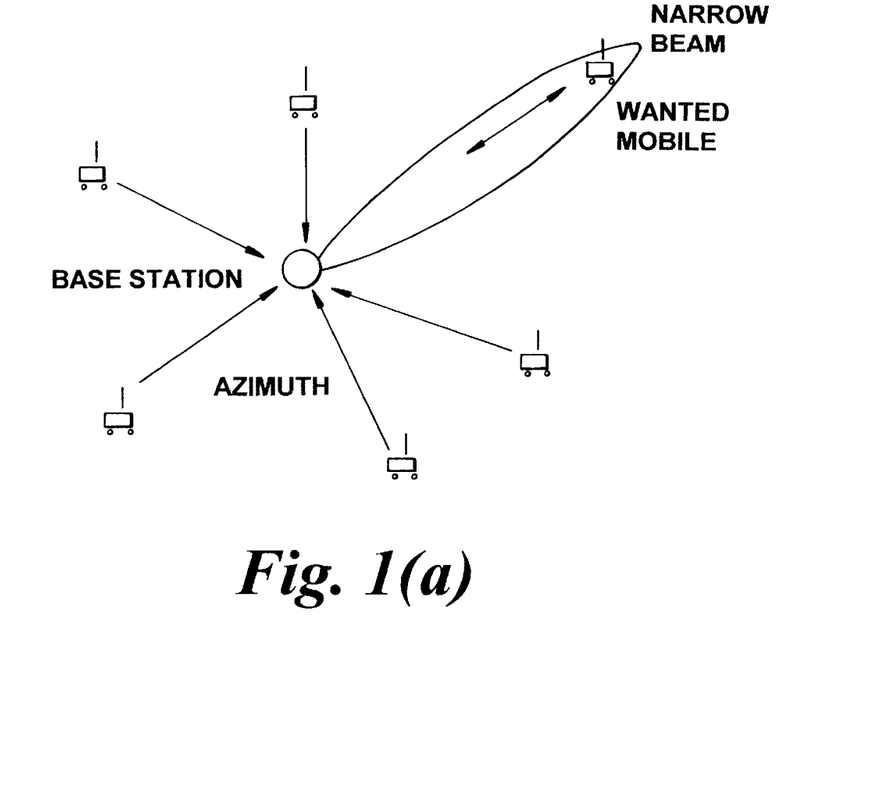
FIGS. 1a and 1b illustrate schematically the use of a narrow beam antenna to communicate between a base station and a mobile station.
Figure 1B:
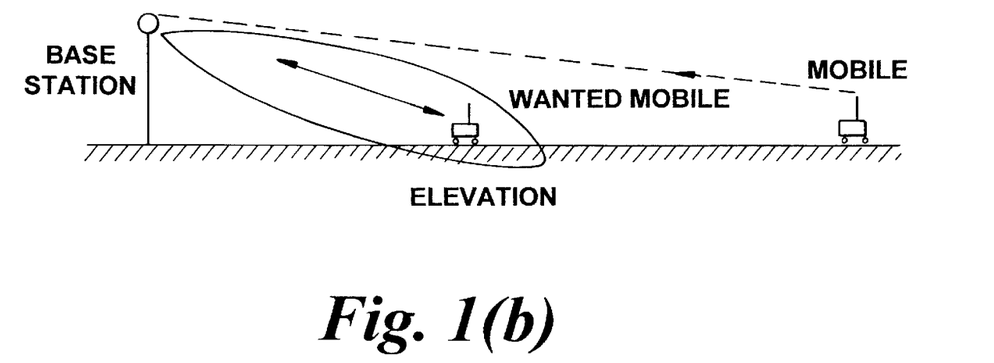

The antenna used at the base station site can potentially make significant improvements to the range and capacity of a cellular radio system. The ideal base station antenna pattern is a beam of narrow angular width as shown in FIG. 1a. The narrow beam is directed at the wanted mobile, is narrow in both the azimuth and elevation planes, and tracks the mobiles movements. When compared to an omni-directional antenna, such a beam will have the dual benefits of having high gain, leading to increased range in thermal noise limited initial deployments, and rejecting interference from co-channel reuse cells allowing higher capacity without cell splitting in mature deployments. The narrow beam reduces interference in a balanced manner on the uplink and downlink. On the uplink the base station receiver is protected from interference generated by mobile station transmitters in the co-channel reuse cells, FIG. 1b. On the downlink the mobile is unlikely to be in the beams of the base station transmitters in the co-channel reuse cells. The extent of the advantage of a narrow beam antenna over an omni-directional antenna is a function of the beamwidth: The narrower the beamwidth, the greater the advantage, but this must be traded off against the increased size and complexity of the antenna. When the narrow beams are contrasted with an omni-directional antenna, it can easily be realised that the narrow beams create high quality transmission paths with minimal interference.

Figure 2:
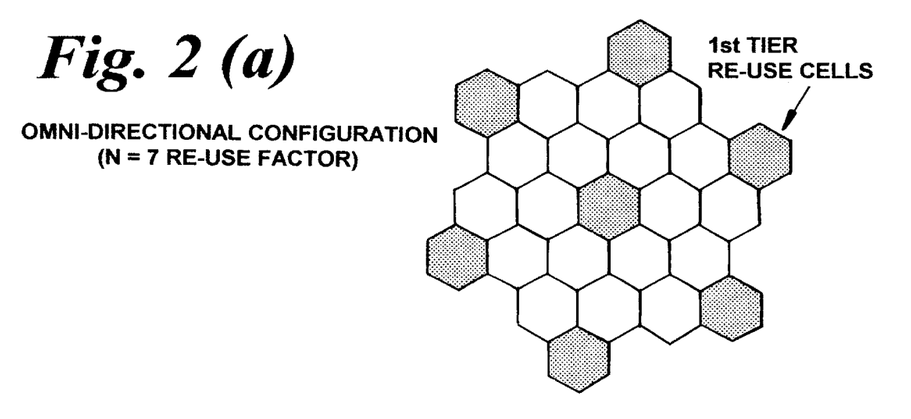
FIGS. 2a–2c illustrate schematically the principle of sectorisation of a base station.

Some of the potential benefits of narrow beam antennas for cellular radio have been recognised in the literature, see for example "A Spectrum Efficient Cellular Base Station Antenna Architecture", S C Swales and M A Beach, Personal & Mobile Radio Communications Conference, Warwick, 1991 and "Proposed Advanced Base Station Antennas for Future Cellular Mobile Radio Systems", W S Davies, R J Long and E Vinnal, Australian Telecomms Research, Vol. 22, No. 1, pp 53–60. Within current systems the manner in which directive antennas are used allows relatively small benefits to be obtained. The use of directive antennas in current cellular radio systems is based on the principle of sectorisation as illustrated in FIG. 2.

The capacity of a cellular system is in general limited by the amount of interference received from other cells. The carrier to interference ratio, C/I, performance of the system determines the frequency re-use strategy, by which the same frequency channels are used in neighbouring cells. The use of narrower beams produces an increase in the carrier to interference performance of the system, allowing a tighter frequency re-use pattern to be used, which in turn provides increased traffic capacity. Conventional cell sites are either omnidirectional, tri-sectored or hex-sectored, with each beam spanning 360°, 120° and 60° sectors respectively.

The main sources of interference in a cellular system come from the so called first tier reuse cells. An omni-directional base station antenna will receive interference from all six first tier reuse cells (FIG. 2a). If an antenna with nominally 120° beamwidth is used, corresponding to a tri-sectored configuration, interference will be received from only two first tier reuse cells (FIG. 2b). If an antenna with 60° beamwidth is used, corresponding to a hex-sectored configuration, interference will be received from only one of the first tier cells (FIG. 2c). In sectored cells the cellular radio transceivers at the base station are only connected to one sector (or antenna) and cannot be used in other sectors within the same cell.

The sectored approach to the use of directive antennas has reached its useful limit at 60° beamwidth and can go no further. There are two key disadvantages of the approach: firstly, the cellular radio transceivers are dedicated to particular sectors which leads to significant levels of trunking inefficiency. In practice this means that many more transceivers are needed at the base station site than for an omni-directional cell of the same capacity; and, secondly, each sector is treated by the cellular radio network (i.e. the base station controller and mobile switches) as a separate cell. This means that as the mobile moves between sectors, a considerable interaction is required between the base station and the network to hand off the call between sectors of the same base station. This interaction, comprising signalling and processing at the base station controller and switch represents a high overhead on the network and reduces capacity.

An alternative method of improving system traffic capacity is to provide downlink beam-forming. The use of downlink beam-forming is proposed for systems such as Digital AMPS (D-AMPS). D-AMPS, also referred to as IS-54, IS-136 and TDMA-3, is the North American digital TDMA mobile telephony standard that is compatible with the AMPS analogue mobile standard. The description shall hereinafter refer to the D-AMPS as an example of a downlink beam-forming system.

A downlink beam-former typically consists of a number of narrow beams formed by either multiple narrow beamwidth antennas or an array of elements in conjunction with a fixed beam-former. Signal processing techniques can then be used to select an appropriate beam directed towards the subscriber. Alternatively, a fully adaptive beam-forming array may be employed, which allows a narrow beam to be steered towards an individual subscriber, and provides the ability to null interferers.

The D-AMPS radio standard includes a constraint on the downlink which precludes the use of the latter option of individually steered beams for each subscriber. The standard dictates that on the downlink the base station must maintain a constant level transmission during the full duration of the frame on any particular bearer channel whenever at least one mobile has been assigned to that bearer. Each traffic channel contains three time slots, and this constraint means that it is not possible to devise a scheme which allows beams to be dynamically moved from one mobile direction to another from one time slot to the next. Thus a downlink beam-former for D-AMPS has to use a fixed beam approach, where the optimum beam is deduced from uplink measurements of signal quality.

The use of a common orthogonal array aperture allows a set of narrow beams to be formed that cover the sector. However, as the beams are orthogonal, the power in each beam will be −4 dB down at the crossover points. This cusping loss leads to a decrease in the mean C/I performance of the system.

An additional traffic capacity loss is realised as a result of the trunking loss caused by tighter sectorisation. For a fixed frequency assignment scheme, where the available carriers are partitioned in a permanent manner across the beam set, the Erlang capacity of the system will decrease as the number of beams per sector increases, assuming the number of traffic channels is constant.

OBJECT OF THE INVENTION

An object of the present invention is to provide a system and method for improving the carrier to interference performance and traffic capacity of a downlink beam-forming system.

SUMMARY OF THE INVENTION

According to the present invention there is provided a base station antenna arrangement comprising a plurality of antennas each capable of forming a separate narrow beam in azimuth, wherein the antennas are positioned such that the beams formed by the antennas overlap and the centre of each beam falls midway between the centre and first null of the adjacent beam to provide a uniform coverage in azimuth.

Preferably, the beams overlap at the 1 dB point. The cusping loss problem associated with the orthogonal beam set described above is thus addressed by the use of the interleaved beams, which are heavily overlapped. In a preferred embodiment of the invention, there is provided a beam set with seven 30° beams covering a 120° sector. The fact that the beams are overlapped also has the effect of reducing the trunking loss that would be expected when the sector is divided into seven narrow beams.

Preferably, there is a non-uniform partitioning of transceivers across the antennas, for instance, the outermost zones of the sector could have a greater number of carriers assigned to them since these zones only have a single-beam coverage. This can help to ensure that the probability of call blocking is approximately uniform across the sector.

In accordance with a further embodiment of the invention, for a call originating in a zone covered by more than one beam, the selection of which beam to use on the downlink is decided on a traffic loading basis. The call is preferably assigned to the beam with the lightest loading, whereby the traffic capacity can be further increased.

According to a still further aspect of the present invention there is provided a method of operating a base station arrangement comprising: a plurality of antennas each capable of forming a separate narrow beam in azimuth, wherein the antennas are positioned such that the beams formed by the antennas are overlapped such that the centre of each beam falls midway between the centre and first null of the adjacent beam to provide a uniform coverage in azimuth, a plurality of r.f. transceivers each for transmitting and receiving r.f. signals for one or more calls, and power combination and division means, whereby a number of transceivers are multiplexed onto each beam. Upon call origination, uplink measurements of signal quality made by a locate receiver allow determination of the best beam to be used. Continued monitoring of signal quality on each beam throughout the duration of the call enables handovers from one beam to another to be executed as the mobile moves through the cell.

Preferably, the antennas are used both for transmit and receive and the signals to be transmitted are directed through diplexing means before being transmitted by the antenna and the signals to be received are directed through diplexing means before being routed through to the transceivers.

BRIEF DESCRIPTION OF DRAWINGS

Embodiments of the invention will now be described with reference to the accompanying drawings, in which.

DESCRIPTION OF PREFERRED EMBODIMENT

There will now be described, by way of example, the best mode contemplated by the inventors for carrying out the invention. In the description that follows, numerous specific details are set out in order to provide a complete understanding of the present invention. It will be apparent, however, to those skilled in the art that the present invention may be put into practice with variations of the specific.

Figure 3:
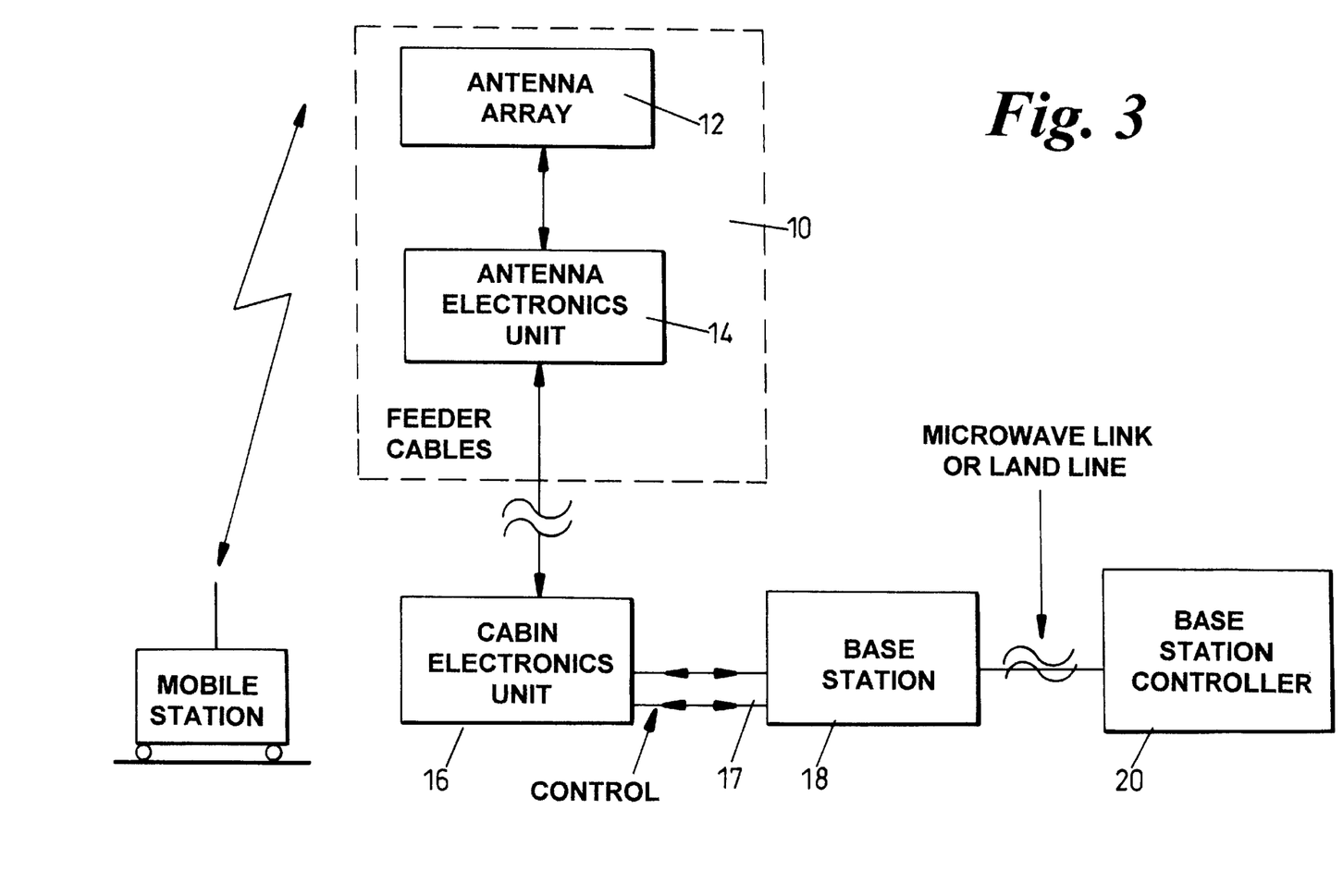
FIG. 3 is a block diagram of the main elements of a base station.

The main elements of a base station antenna arrangement as shown in FIG. 3 comprise a mast tower or building 10 supporting the antenna array(s) 12 and associated antenna electronics unit 14, which includes beam-formers, diplexers and amplifiers. The antenna electronics unit 14 is connected via a cabin electronics unit 16 to the base station 18 which is under the control of a base station controller 20.

Figure 4:
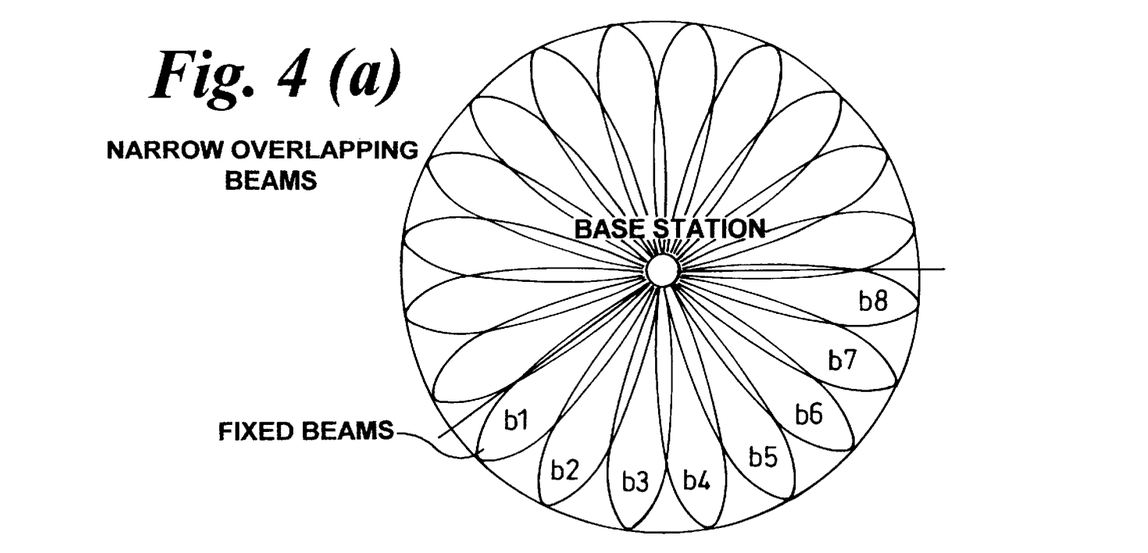
FIGS. 4a, 4b, and 4c illustrate the operation of a multiple narrow beam base station.

FIG. 4 illustrates the system operation. FIG. 4a shows the concept of a multiplicity of narrow, overlapping beams covering a sector of a cell area surrounding a base station. For simplicity, the beams are not shown overlapping to any great extent. The beams are referenced b1–b8. FIG. 4b shows how, at time $t_1$ four mobile stations ms1-ms4 are served by beams b2, b6 and b7. Beam b2 serves two mobile stations ms1 and ms2 at this time, b6 serves ms3 and b7 serves ms4. As the mobile stations move geographically in relation to the base station, at time $t_2$ beam b1 now serves mobile station ms1, b4 serves ms3 and b8 serves ms4. Mobile station ms2 has, at time $t_2$ moved out of the cell coverage of this base station and will now be served by an adjoining base station (not shown).

Figure 5:
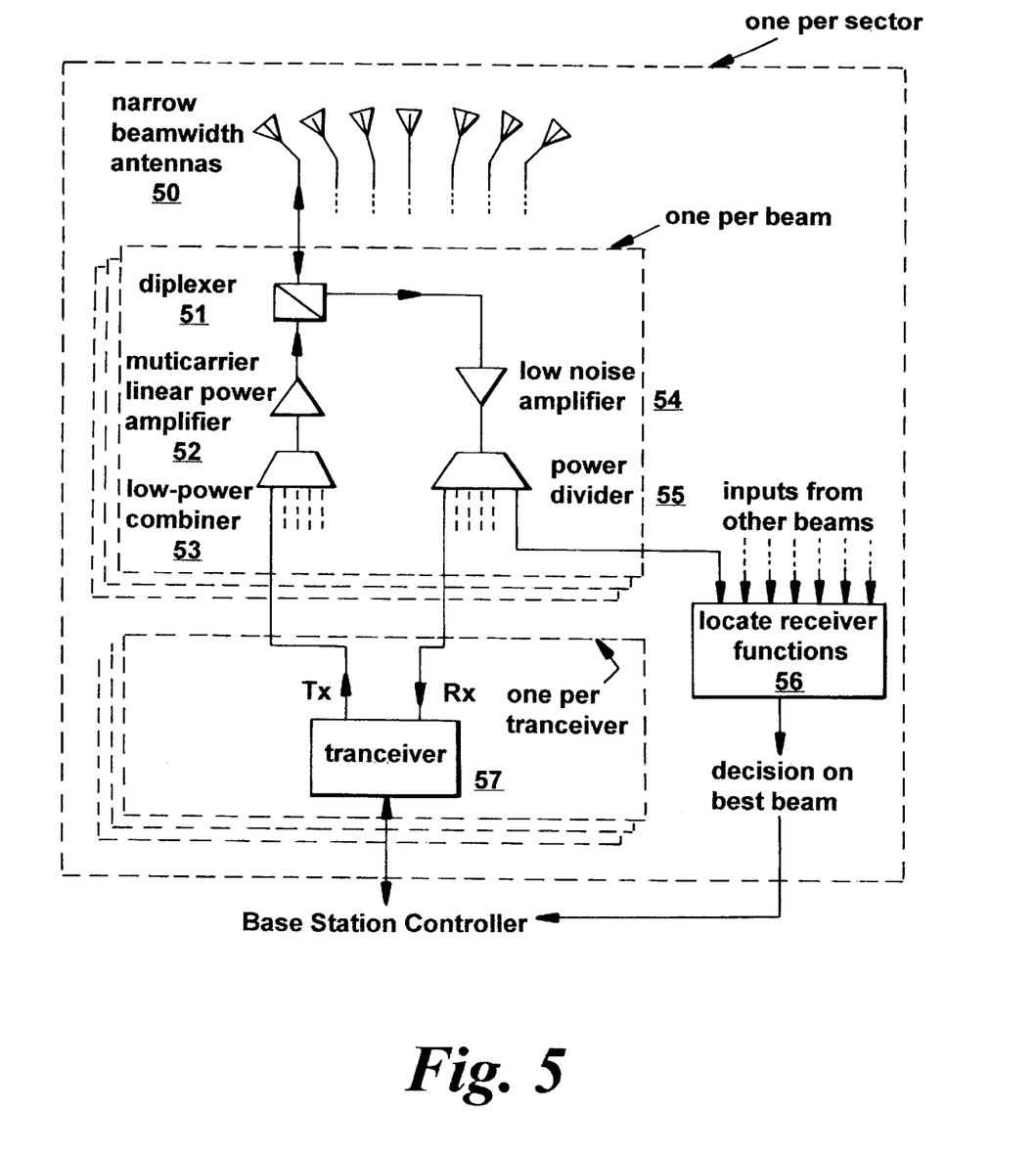
FIG. 5 illustrates a typical system configuration.

FIG. 5 provides an architecture for implementing the overlapped-beam downlink beamformer concept. The specific details of the uplink architecture are not limited to any known arrangement: nevertheless, a locate receiver 56 is provided, which is operable to monitor received signal strength from a mobile on each of the uplink beams, and is operable to determine which downlink beam to use. On the downlink, the 120° sector is spanned by a set of seven heavily-overlapped beams f1–f7 from the antenna in FIG. 6. Each beam is hard-allocated a fixed number of bearer channels; this number need not be the same for each beam, for example cell site history/population density may be used in a planning stage to provide for an uneven beam allocation.

In transmit mode, the outputs of each of the RF transceivers 57 for a particular beam are summed in a low-power combiner 53, and are passed through a wide band multi-carrier linear power amplifier 52, before being fed to the narrow-beam antenna via a diplexer 51. The array of seven antennas 50 in this example covers a 120° sector. As an alternative to using individual narrow-beam antennas to form the beam set, the signals could be fed into the inputs of an 8-way butler matrix before being fed into the power amplifier, with four of the matrix outputs being fed to 120° antenna elements. Using all 8 outputs of the butler matrix with an 8-element antenna array would produce a set of eight orthogonal beams across the sector, with a maximum cusping loss of 4 dB. Using only four of the outputs, the other four outputs being terminated, produces a set of wide, heavily overlapped beams, which have a cusping loss of less than 1 dB. If three overlapped beams are desired, then a less complicated beam former could be used, such as a 4-way butler matrix with two outputs to a 2-element antenna array.

In receive mode, signals are fed from an antenna 50, switched through a diplexer 51, amplified by a low noise amplifier 54 and fed into the inputs of a power divider 55. The output signals from the power divider are distributed to the transceivers 57 associated with that beam. A locator receiver 56 can be employed to provide information relating to the best receive signal to determine the optimum beam to use.

Figure 6:
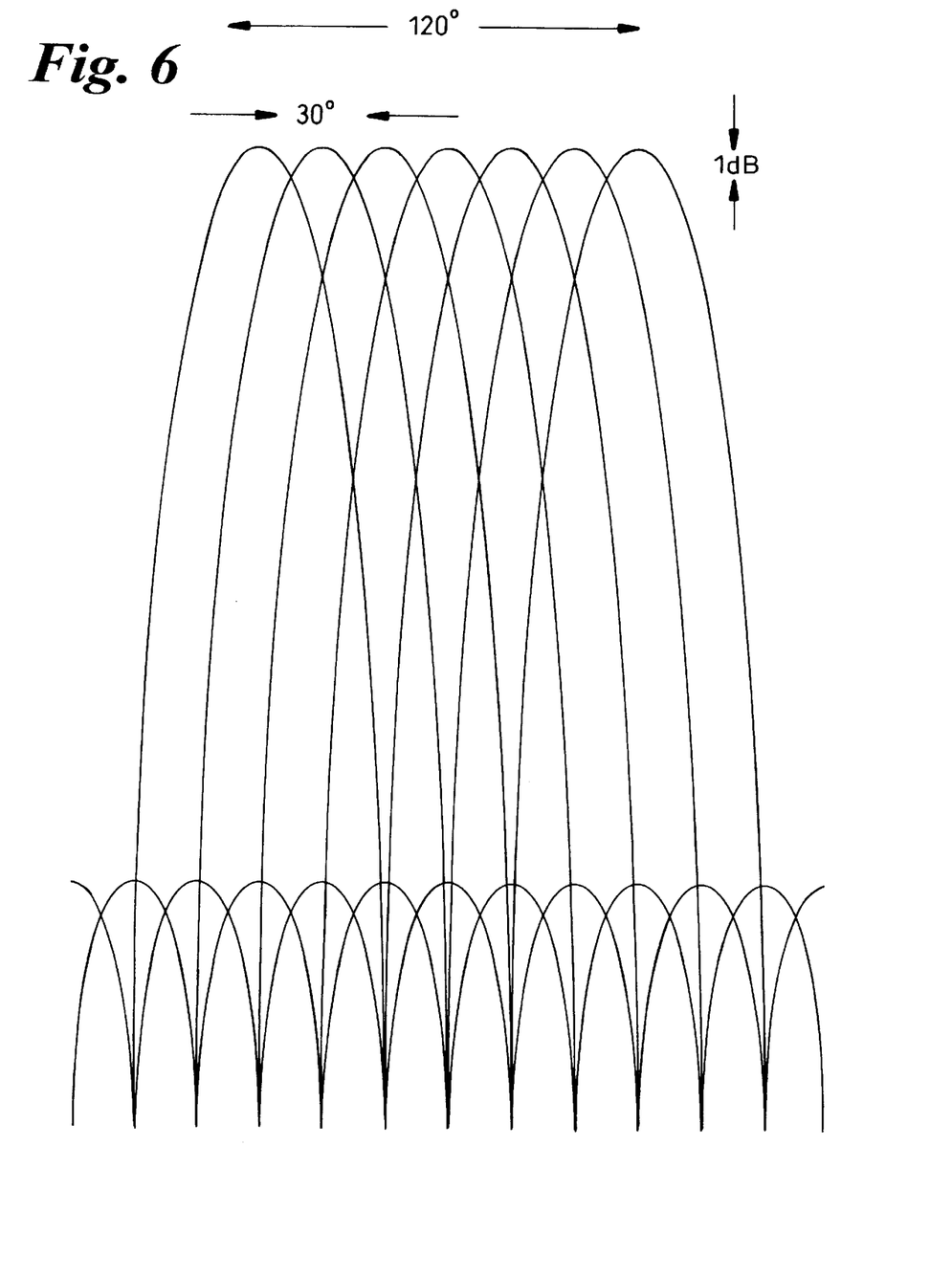
FIG. 6 illustrates a downlink beam pattern for the system shown in FIG. 5.

The cusping loss problem associated with the orthogonal beam set described above is thus addressed by the use of a set of interleaved beams, which are heavily overlapped such that the centre of each beam falls midway between the centre and first null of the adjacent beam. An example of such a beam set, with seven 30° beams covering a 120° sector is shown in FIG. 6. The cusps are now only around 1 dB down on the peak of beam. The fact that the beams are overlapped also has the effect of reducing the trunking loss that would be expected when the sector is divided into seven narrow beams. The outermost zones of the sector only have single-beam coverage, and so the outer beams require a greater number of carriers assigned to them to ensure the probability of call blocking is approximately uniform across the sector.

Simulations have shown that the traffic capacity of a cellular system using a downlink beamformer with interleaved beams and fixed frequency assignment can be optimised by non-uniform partitioning of the available carriers across the beam set.

Traffic capacity can be further increased by the use of load-balanced call assignment. For a call originating in a zone covered by more than one beam, the selection of which beam to use on the downlink is decided on a traffic loading basis. The call is assigned to the beam with the lightest loading.

The improvements in traffic capacity that can be achieved by the use of an interleaved-beam D-AMPS system are summarised in the table below. The figures are derived from simulation results from a cellular traffic simulator programme. The table gives Erlang capacity values per 120° sector for each scenario under consideration, along with the traffic channel assignment in each case. The capacity values correspond to a maximum call blocking probability of 2%. With such systems, where the sector is subdivided by the use of narrow beams, this 2% limitation is applied to each zone of the sector individually. Thus the overall traffic capacity of the sector, for which a uniform traffic density model is used, is limited by the zone with the highest blocking rate.

Three systems are considered; a conventional tri-sectored system running an N=7 reuse pattern, a three 60°-beam system running an N=4 reuse pattern and a seven-beam system that uses 30° beams to allow an N=3 reuse. Carrier-to-interferer simulations have shown that all three systems exhibit similar levels of C/I performance.

The systems considered all correspond to a D-AMPS system with 12.5 MHz of spectrum and a broadcast control channel running a conventional N=7 tri-sectored reuse pattern. This means that there are 395 frequency channels available for traffic, with three timeslots per channel. Thus in a tri-sectored system, there are 18, 32 and 43 channels per 120° sector for N=7, N=4 and N=3 reuse patterns respectively.

The traffic capacity of the such systems can be affected by the way the available frequency channels are allocated to the beams and by the method of assigning incoming calls to a specific beam when the overlapped beam architecture allows a choice to be made. Simulations have been conducted relating to the traffic capacity of a cellular system using a downlink beamformer with interleaved beams and have shown that fixed frequency assignment can be optimised by non-uniform partitioning of the available carriers across the beam set. A table has been prepared below with the rows of the table corresponding to different implementations of these two criteria. The various implementations will now be discussed.

| | Implementation | Conventional trisector N = 7 reuse | 3-beam Smart N = 4 reuse | 7-beam Smart N = 3 reuse |
|---|---|---|---|---|
| A | Uniform partitioning, Random beam selection | 44.0 Erlangs 18 TRXs per sector | 58.2 Erlangs 10:10:10 allocation | 60.1 Erlangs 6:6:6:6:6:6:6 allocation |
| B | Uniform partitioning, Load-sensitive beam selection | — | 69.3 Erlangs 10:10:10 allocation | 76.8 Erlangs 6:6:6:6:6:6:6 allocation |
| C | Non-uniform partitioning, Load-sensitive beam selection | — | 77.0 Erlangs 14:4:14 allocation | 98.5 Erlangs 10:4:5:5:5:4:10 allocation |
| D | Non-uniform partitioning, Weighted-beam selection | — | 78.1 Erlangs 12:8:12 allocation weight = 4.0 | 99.3 Erlangs 9:5:5:5:5:5:9 allocation weight = 1.6 |
| E | Non-uniform partitioning plus | — | 80.0 Erlangs 13:5:13 | 99.3 Erlangs 9:5:5:5:5:5:9 |

| Implementation | Conventional trisector N = 7 reuse | 3-beam Smart N = 4 reuse | 7-beam Smart N = 3 reuse |
|---|---|---|---|
| 120° overlay Weighted-beam selection | | allocation plus one 120° overlay weight = 3.0 | allocation, no overlay weight = 1.6 |

Implementation A—Uniform partitioning, Random beam selection.

The simplest implementation of the interleaved-beam architecture involves uniform partitioning of the available channels across the beam set, and random beam selection. Random beam selection occurs when a call originates in a zone covered by more than one beam (i.e. one of the inner zones of the sector) and the choice of beams to which the call is assigned is made on a purely random basis. If an initial choice of beam has no free timeslots available, then a second beam is tried. In row A of the table, the traffic capacity of systems using this implementation is shown. The baseline N=7 tri-sectored system has 18 voice channels per sector, giving a traffic capacity of 44.0 Erlangs. For a 3-beam antenna system, 10 channels can be assigned to each beam, providing a traffic capacity of 58.2 Erlangs. With a 7-beam antenna system, 6 voice channels per beam will provide 60.1 Erlangs.

Implementation B—Uniform partitioning. Load-sensitive beam selection.

The use of random beam selection does not allow efficient use of the available trunks. A more complex approach to beam selection is to use a load-sensitive assignment algorithm. For calls originating in a zone covered by more than one beam, this involves interrogating the call assignment table to determine the traffic loading on each of the candidate beams, and then assigning the call to the beam with the lightest loading. This reduces the probability of a particular beam being fully loaded whilst others are relatively unused, thus allowing more efficient use of resources. The effect on traffic capacity is clear from the figures in the table, which are given in row B. For the 3-beam system, traffic capacity has increased to 69.3 Erlangs, whilst the 7-beam system achieves 76.8 Erlangs.

Implementation C—Non-uniform partitioning, Load-sensitive beam selection.

The use of uniform partitioning of the available traffic channels across the antenna beam set is not optimum from a capacity point of view. This arises because the inner zones of the sector have dual-beam coverage, due to the overlapped beam set, whilst the outermost zones are only covered by a single beam. Thus the traffic capacity measured by the simulator, which uses a uniform traffic density model, is limited by call blocking in the outer zones.

The traffic capacity can be increased by use of non-uniform partitioning of the available channels across the beams. With a greater number of channels assigned to the outer beams, the probability of call blocking becomes more uniform across the sector, leading to a greater overall traffic capacity.

This is illustrated by the Erlang capacity values in row C of the table. For the two antenna systems under consideration, the optimum assignment of frequency channels to the beams has been found, and the subsequent increase in traffic capacity can be seen. For the 3-beam system, the optimum channel partitioning was found to be in the ratio 14:4:14 across the three beams, increasing the traffic capacity of the system to 77 Erlangs. For the 7-beam system, a capacity of 98.5 Erlangs was obtained with a channel partitioning of 10:4:5:5:5:4:10 across the beam set.

Implementation D—Non-uniform partitioning, Weighted-beam selection.

Further traffic capacity improvements can be achieved by the use of a weighted beam selection algorithm. For calls originating in zones with dual-beam coverage, rather than performing a simple comparison of traffic loading on each candidate beam as described above in implementation B, this implementation adds a weighting to the inner beams such that there will be a greater probability that they are selected to carry the call. This scheme ensures that the outer beams, which are solely responsible for coverage of the outermost zones of the sector, have their capacity reserved to a greater degree for those zones.

The reasoning is similar to that used to describe the non-uniform partitioning of channels across the beam set, and a corresponding increase in traffic capacity can be seen from row D of the table. The use of the weighted-beam selection algorithm produces a different optimum channel partitioning to that seen for implementation C. For the 3-beam system, a traffic capacity of 78.1 Erlangs is achieved with a channel assignment of 12:8:12, with a weighting factor of 4.0. By this, it is meant that the inner beam is weighted favourably by a factor of four. A weighting factor of unity corresponds to equal weighting to all beams, equivalent to implementation B or C. For the 7-beam system, frequency channel partitioning in the ratio 9:5:5:5:5:5:9 combined with an inner beam weighting of 1.6 produces a traffic capacity of 99.3 Erlangs.

Implementation E—Non-uniform partitioning with 120° Overlay, Weighted-beam selection.

An additional method for increasing the traffic capacity of the interleaved-beam antenna systems involves the use of 120° overlay beams spanning the entire sector. The frequency channels used on such beams would run an N=7 reuse pattern due to C/I issues, whilst narrow antenna beams run N=3/N=4 as before. The benefits of employing 120° overlay beams derive from the efficiency at which the set of 395 available frequency channels can be utilised across the system.

For example, the 3-beam antenna system considered here runs an N=4 reuse pattern, resulting in 32 channels being available in each sector. This implies that 11 channels out of the 395 total will remain unused. If one frequency channel is assigned to a 120° overlay beam in each sector, and such frequencies run an N=7 reuse pattern, then the number of channels available for assignment to the narrow beams decreases to 31. However, there are now only 2 channels out of 395 that are unused; this increased efficiency in the assignment of frequency channels has a beneficial effect in terms of traffic capacity, as can be seen in row E of the table. By assigning one frequency channel in the sector to the 120° overlay beam, the traffic capacity of the 3-beam system is increased to 80 Erlangs. This figure can be achieved by assigning the remaining 31 channels in the ratio 13:5:13 across the three interleaved beams. The inner beam has been given a weighting of 3.

The use of overlay beams for the 7-beam Smart system does not give corresponding improvements in traffic capacity; the most efficient method of assigning frequency channels involves allocating all of them to the antenna beam set. Thus the results in row E of the table are identical to those in row D.

We claim:

1. A base station antenna arrangement comprising a plurality of antennas capable of forming a multiplicity of separate overlapping narrow beams in azimuth, wherein the antennas are positioned such that the beams formed by the antennas are overlapped such that the centre of each beam falls midway between the centre and first null of the adjacent beam to provide a substantially uniform coverage in azimuth.

2. An arrangement according to claim 1 wherein adjacent beams overlap at the 1 dB point.

3. An arrangement according to claim 1 wherein there is a non-uniform partitioning of transceivers across the antennas.

4. An arrangement according to claim 1 wherein, for a call originating in a zone covered by more than one beam, selection means select which beam should handle the call.

5. An arrangement according to claim 1 wherein, for a call originating in a zone covered by more than one beam, the selection of which beam to use on the downlink is decided on a traffic loading basis.

6. A base station antenna arrangement comprising a plurality of antennas capable of forming a multiplicity of separate overlapping narrow beams in azimuth, a plurality of r.f. transceivers each for transmitting and receiving r.f. signals for one or more calls, and power combination and division means; wherein the power combination and division means are operable to multiplex a number of transceivers onto each beam; whereby r.f. call signals can be exchanged with a mobile station located in an area covered by the narrow beams with the same transceiver, and; wherein the antennas are positioned such that the beams formed by the antennas are overlapped such that the centre of each beam falls midway between the centre and first null of the adjacent beam provides a substantially uniform coverage in azimuth.

7. An arrangement according to claim 6 wherein separate amplifying means are provided for each beam coupled between the power combination and division means and each antenna.

8. An arrangement according to claim 6 wherein transmission and reception are effected through a common antenna aperture.

9. An arrangement according to claim 6 further including means for monitoring the signal quality of each receive channel on every beam.

10. An arrangement according to claim 6 wherein each antenna comprises a linear array of antenna elements, each array being provided with separate elevation beamforming means being coupled to all the elevation beamforming means via diplexer means.

11. An arrangement according to claim 6 wherein the amplifying means are situated between the beamforming means and the diplexer means.

12. A method of operating a base station arrangement comprising: a plurality of antennas each capable of forming a separate narrow beam in azimuth, wherein the antennas are positioned such that the beams formed by the antennas are overlapped such that the centre of each beam falls midway between the centre and first null of the adjacent beam to provide a uniform coverage in azimuth, a plurality of r.f. transceivers each for transmitting and receiving r.f. signals for one or more calls, and power combination and division means; wherein the power combination and division means are operable to multiplex a number of transceivers onto each beam, whereby r.f. call signals can be exchanged with a mobile station located in any area covered by the narrow beams with the same transceiver; the method comprising the following steps: for a given signal received from a mobile, determining the best beam to be selected on the uplink by measuring the quality of the received signal strength from the mobile; selecting the antenna which would provide the best beam for a given channel on the downlink; transmitting a signal from a transceiver, through a power combiner and through the selected antenna, to the mobile.

13. A method as claimed in claim 12 wherein the antennas are used both for transmit and receive and wherein the signals to be transmitted are directed through diplexing means before being transmitted by the antenna array and the signals to be received are directed through diplexing means before being routed through the switching matrix.

\* \* \* \* \*